United States Patent
Zheng (10) Patent No.: US 12,362,425 B1
(45) Date of Patent: Jul. 15, 2025

(54) CONNECTING STRUCTURE, BATTERY BOX, AND LIGHTING DEVICE

(71) Applicant: Junhua Zheng, Guangdong (CN)

(72) Inventor: Junhua Zheng, Guangdong (CN)

( * ) Notice: Subject to any disclaimer, the term of this patent is extended or adjusted under 35 U.S.C. 154(b) by 0 days.

(21) Appl. No.: 19/016,330

(22) Filed: Jan. 10, 2025

(30) Foreign Application Priority Data

Dec. 23, 2024 (CN) .......................... 202423211484.2

(51) Int. Cl.
| | |
|---|---|
| *F21V 23/00* | (2015.01) |
| *F21S 4/10* | (2016.01) |
| *F21S 9/02* | (2006.01) |
| *F21V 23/02* | (2006.01) |
| *F21V 23/06* | (2006.01) |
| *H01M 50/262* | (2021.01) |
| *F21Y 115/10* | (2016.01) |

(52) U.S. Cl.
CPC ............ *H01M 50/262* (2021.01); *F21S 4/10* (2016.01); *F21S 9/02* (2013.01); *F21V 23/001* (2013.01); *F21V 23/023* (2013.01); *F21V 23/06* (2013.01); *F21Y 2115/10* (2016.08)

(58) Field of Classification Search
CPC . H01M 50/262; F21S 4/10; F21S 9/02; F21V 23/001; F21V 23/023; F21V 23/06; F21Y 2115/10
See application file for complete search history.

(56) References Cited

U.S. PATENT DOCUMENTS

| | | | |
|---|---|---|---|
| 2003/0137833 A1* | 7/2003 | Hsu ........................ | F21L 4/027 |
| | | | 362/116 |
| 2022/0228718 A1* | 7/2022 | Zhang ................. | H01M 50/247 |
| 2023/0029767 A1* | 2/2023 | Bannai ................ | H01M 50/213 |
| 2023/0120375 A1* | 4/2023 | Nakamura .......... | H01M 50/358 |
| | | | 429/100 |
| 2024/0322312 A1* | 9/2024 | Schurz ................. | F16B 37/125 |
| 2025/0015410 A1* | 1/2025 | Kawakami .......... | H01M 50/233 |

* cited by examiner

*Primary Examiner* — Evan P Dzierzynski
(74) *Attorney, Agent, or Firm* — Daniel M. Cohn (57) ABSTRACT

A connecting structure, a battery box, and a lighting device are provided. The battery box includes the connecting structure, the connecting structures includes a fastener, a first connecting component, and a second connecting component. The fastener includes a first limiting portion, a connecting portion, and a second limiting portion, the first limiting portion, the connecting portion, and the second limiting portion are connected in sequence, an outer diameter of the connecting portion is less than both an outer diameter of the first limiting portion and an outer diameter of the second limiting portion. The first connecting component defines a first fixing hole. The second connecting component defines a second fixing hole.

8 Claims, 4 Drawing Sheets

CONNECTING STRUCTURE, BATTERY BOX, AND LIGHTING DEVICE

TECHNICAL FIELD

The present disclosure relates to a technical field of connecting structures, and in particular to a connecting structure, a battery box, and a lighting device.

BACKGROUND

In fields of toys, battery boxes, and home furnishings, fasteners are commonly provided to fix two housings. When the two housings are required to separate for tasks, such as maintenance, battery replacement, cleaning, etc., users need to remove the fasteners, which may easily lead to loss of the fasteners. Particularly, if there is no designated storage or clear labeling, the users may forget where the fasteners are placed, reassembly of the two housings may be difficult. Moreover, since the fasteners are generally small in size and different in shape, there is a risk that children or pets may accidentally swallow or play with the fasteners, causing serious consequences, such as choking or intestinal obstruction.

SUMMARY

Embodiments of the present disclosure provide a connecting structure, a battery box, and a lighting device, which are capable of avoiding loss of fasteners.

In a first aspect, the embodiments of the present disclosure provide the connecting structure, including a fastener, a first connecting component, and a second connecting component. The fastener includes a first limiting portion, a connecting portion, and a second limiting portion, the first limiting portion, the connecting portion, and the second limiting portion are connected in sequence, an outer diameter of the connecting portion is less than both an outer diameter of the first limiting portion and an outer diameter of the second limiting portion. The first connecting component defines a first fixing hole. The second connecting component defines a second fixing hole. A hole diameter of at least one end of the first fixing hole close to the second fixing hole is less than both the outer diameter of the first limiting portion and the outer diameter of the second limiting portion, the first limiting portion is detachably connected to the second fixing hole, in an assembled state, the connecting portion is disposed in the first fixing hole, the first limiting portion and the second limiting portion are respectively disposed at two opposite sides of the first fixing hole, and the first limiting portion is fixed in the second fixing hole.

In some embodiments, the second fixing hole is a through hole, the first limiting portion is in interference fit with the second fixing hole; or, the second fixing hole is a threaded hole, the first limiting portion includes a rod body and external threads protruding from an outer wall of the rod body, the first limiting portion is in threaded fit with the second fixing hole.

In some embodiments, the first limiting portion includes a rod body and a protruding component protruding from an outer wall of the rod body, the protruding component is detachably connected to the rod body.

In some embodiments, the protruding component is a limiting ring.

In some embodiments, a groove is annularly defined on the outer wall of the rod body, the limiting ring is partially embedded in the groove and is partially exposed out of the groove.

In some embodiments, the first fixing hole includes a first hole segment and a second hole segment, the first hole segment is connected to the second hole segment, the first hole segment is closer to the second fixing hole than the second hole segment. A hole diameter of the second hole segment is less than the outer diameter of the first limiting portion, and the hole diameter of the second hole segment gradually increases in a direction away from the first hole segment to form a guide surface.

In some embodiments, the outer diameter of the first limiting portion is not greater than 1.3 times a hole diameter of the first hole segment.

In some embodiments, the second fixing hole includes a third hole segment and a fourth hole segment, the third hole segment is connected to the fourth hole segment, the third hole segment is closer to the first hole segment than the fourth hole segment. A hole diameter of the third hole segment is greater than the outer diameter of the first limiting portion, in the assembled state, the fourth hole segment is fixed and engaged with the first limiting portion.

In some embodiments, a maximum hole diameter of the second hole segment is greater than the outer diameter of the first limiting portion.

In some embodiment, an outer contour of the second limiting portion is matched with an inner contour of the second hole segment, in the assembled state, the second limiting portion is accommodated in the second hole segment.

According to the connecting structure of the present disclosure, in the assembled state, the fastener passes through the first fixing hole, and the first limiting portion is fixed in the second fixing hole, so that the first connecting component is fixed with respect to the second connecting component. In a disassembled state, the first limiting portion is separated from the second fixing hole, so as to separate the first connecting component and the second connecting component, moreover, the first limiting portion is limited in the first fixing hole, so as to prevent the fastener from separating from the first connecting component. Such connection manner is simple, and the fastener is prevented from being lost after disassembly, so that possibility that infants or pets accidentally swallow the fastener is avoided. The first connecting component and the second connecting component are injection-molded parts, and the connecting structure is applied to fields of toys, fans, battery boxes, etc. For example, some toys need to disassemble housings to replace a battery or clean internal components, the first connecting component and the second connecting component are respectively two housings of each of the toys, and each two housings are assembled and disassembled through a corresponding fastener. Similarly, when the fans need to disassemble housings to clean fan blades, a front housing and a rear housing of each of the fans are respectively formed as the first connecting component and the second connecting component, and the front housing and the rear housing are assembled and disassembled through a corresponding fastener.

In a second aspect, the embodiments of the present disclosure provide a battery box, including at least one fastener, a first housing, a second housing, and a first battery. The at least one fastener includes a first limiting portion, a connecting portion, and a second limiting portion, the first limiting portion, the connecting portion, and the second limiting portion are connected in sequence, an outer diameter of the connecting portion is less than both an outer diameter of the first limiting portion and an outer diameter of the second limiting portion. The first housing defines at least one first fixing hole, a hole diameter of the at least one first fixing hole is less than the outer diameter of the first limiting portion and is greater than the outer diameter of the connecting portion. The second housing is detachably connected to the first housing, the first housing and the second housing are enclosed to form a mounting cavity, the second housing defines at least one second fixing hole, the at least one second fixing hole is detachably engaged with the first limiting portion. The first battery is disposed in the mounting cavity. In an assembled state, the at least one fastener passes through the at least one first fixing hole and is fixed in the at least one second fixing hole to fix the first housing and the second housing with respect to each other, and in a disassembled state, the at least one fastener is detached from the at least one second fixing hole, the first housing and the second housing are detachable, and the first limiting portion is limited at the at least one first fixing hole, so as to prevent the at least one fastener from separating from the at least one first fixing hole.

In some embodiments, the first housing includes a first housing outer wall and at least one first fixing column, the at least one first fixing column is connected to an inner wall surface of the first housing outer wall and extends into the mounting cavity, the at least one first fixing column and the first housing outer wall together define the at least one first fixing hole. The second housing includes a second housing outer wall and at least one second fixing column, the at least one second fixing column is connected to an inner wall surface of the second housing outer wall and extends into the mounting cavity, the at least one second fixing hole is defined on the at least one second fixing column.

In some embodiments, the second housing includes an assembling portion and a folding portion. The assembling portion is fixedly connected to the first housing, the folding portion is rotatable around a position thereof connected to the assembling portion and is detachably connected to the first housing, so as to open or close the mounting cavity. The at least one second fixing hole is defined on the folding portion.

In some embodiments, the first housing includes a first protruding limiting portion and a second protruding limiting portion. The first protruding limiting portion is disposed in the mounting cavity and defines a first accommodating groove with a bottom wall of the mounting cavity. The second protruding limiting portion is disposed in the mounting cavity and defines a second accommodating groove with the bottom wall of the mounting cavity. At least one of the first accommodating groove and the second accommodating groove is configured to mount the first battery, the first protruding limiting portion and the second protruding limiting portion are both circular, the at least one first fixing hole is defined on a limiting space between the first protruding limiting portion and the second protruding limiting portion.

In some embodiments, two first fixing holes are provided and are respectively defined at two opposite sides of each of the first protruding limiting portion and the second protruding limiting portion.

In a third aspect, the embodiments of the present disclosure provide a lighting device, including a lighting assembly and the battery box as foregoing. The lighting assembly includes a first wire, a second wire, and a light source component, the light source component is electrically connected to the first wire and the second wire. The battery box is electrically connected to the first wire and the second wire and is configured to supply power to the light source component.

In some embodiments, the battery box includes the at least one fastener, the first housing, the second housing, the first battery, a second battery, a first conductive component, a second conductive component, and a conductive body. The first housing and the second housing are enclosed to form the mounting cavity. The first battery, the second battery, the first conductive component, the second conductive component, and the conductive body are all disposed in the mounting cavity, the at least one fastener cooperates with the first housing and the second housing to switch the first housing and the second housing between the assembled state and a disassembled state. The first battery is electrically connected to the first wire through the first conductive component, the second battery is electrically connected to the second wire through the second conductive component, and the first battery is electrically connected to the second battery through the conductive body.

In some embodiments, the conductive body includes a mounting portion, a first elastic contact portion, and a second elastic contact portion, the first elastic contact portion and the second elastic contact portion are respectively connected to two ends of the mounting portion. The first elastic contact portion is configured to connect to the first battery, and the second elastic contact portion is configured to connect to the second battery.

In some embodiments, the first housing includes at least one first snap-fit structure, the second housing includes at least one second snap-fit structure, the at least one first snap-fit structure is snap-fitted to the at least one second snap-fit structure.

In some embodiments, the light source component includes lamp beads disposed at intervals, and the lamp beads are respectively connected to the first wire and the second wire.

BRIEF DESCRIPTION OF DRAWINGS

In order to more clearly illustrate embodiments of the present disclosure or technical solutions in the prior art, accompanying drawings required in description of the embodiments or the prior art are briefly described below, and obviously, the accompanying drawings in the following description are merely some embodiments of the present disclosure, and for those who skilled in the art, other drawings may be obtained according to structures shown in these drawings without creative efforts.

Reference numerals in the drawings: 1. lighting device; 10. battery box; 110. fastener; 111. first limiting portion; 1111. rod body; 1112. protruding component; 1113. groove; 112. connecting portion; 13. second limiting portion; 120. first housing; 120A. mounting cavity; 120B. first accommodating groove; 120C. second accommodating groove; 120D. limiting space; 120a. first fixing hole; 120b. first hole segment; 120c. second hole segment; 121. first housing outer wall; 122. first fixing column; 123. first protruding limiting portion; 124. second protruding limiting portion; 125. first snap-fit structure; 130. second housing; 130a. second fixing hole; 130b. third hole segment; 130c. fourth hole segment; 131. second housing outer wall; 132. second fixing column; 126. guide surface; 134. assembling portion; 135. folding portion; 136. second snap-fit structure; 140. first battery; 150. second battery; 160. first conductive component; 161. first fixing portion; 162. third elastic contact portion; 170. second conductive component; 171. second fixing portion; 172. fourth elastic contact portion; 180. conductive body; 181. mounting portion; 182. first elastic contact portion; 183. second elastic contact portion; 20. lighting assembly; 210. first wire; 220. second wire; 230. light source component; 240. protective sleeve; 2. connecting structure; 21. first connecting component; 22. second connecting component.

Implementations, functional features, and advantages of the present disclosure are further described with reference to the accompanying drawings in combination with the embodiments.

DETAILED DESCRIPTION OF EMBODIMENTS

In order to better understand technical solutions of the present disclosure, embodiments of the present disclosure are described in detail below with reference to accompanying drawings.

When following description refers to the accompanying drawings, unless otherwise indicated, the same numbers in different drawings represent the same or similar elements. Implementations described in following exemplary embodiments do not represent all implementations consistent with this application. Instead, they are merely examples of apparatuses and methods consistent with some aspects of the present disclosure as recited in appended claims.

In the description of the present disclosure, it should be understood that terms "first", "second", etc. are only used for descriptive purposes, and cannot be understood as indicating or implying relative importance. Those who skilled in the art would understand specific meanings of the foregoing terms in the present disclosure according to specific situations. In addition, in the description of the present disclosure, unless otherwise stated, "a plurality of" means two or more, "and/or" used herein is merely an association relationship describing associated objects. For example, A and/or B may indicate three cases that A exists alone, A and B exist, and B exists alone, and a character "/" in the specification generally indicates an "or" relationship between the associated objects Unless otherwise defined, all technical and scientific terms used herein have the same meaning as commonly understood by those who skilled in the art to which the present disclosure belongs. The terms used in the specification are only for the purpose of describing specific embodiments, and are not intended to limit the present disclosure.

As used herein, the term "and/or" includes any and all combinations of one or more of associated listed items.

Figure 1:
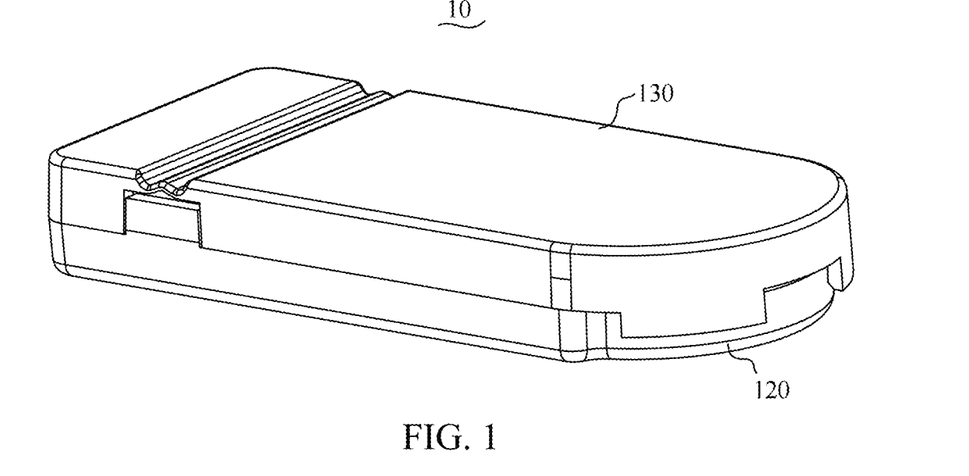
FIG. 1 is a structural schematic diagram of a battery box according to one embodiment of the present disclosure.
Figure 2:
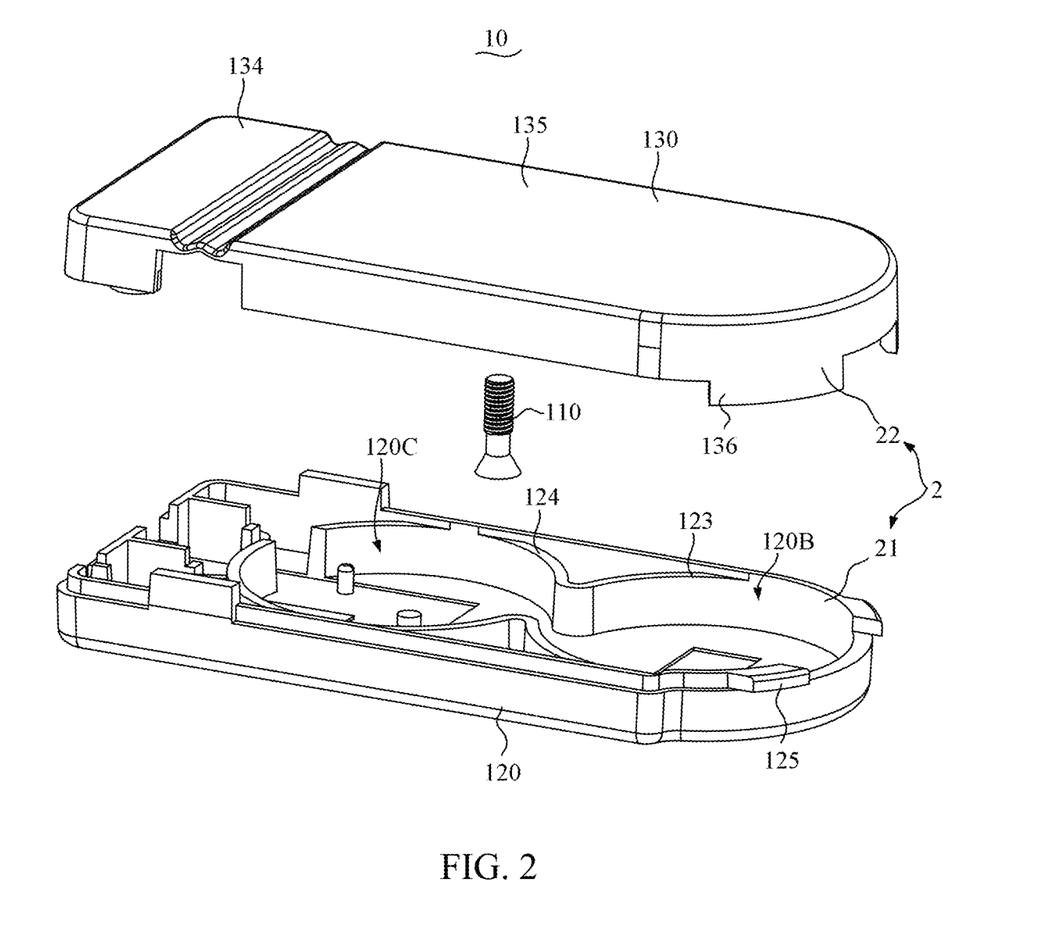
FIG. 2 is an exploded schematic diagram of the battery box according to one embodiment of the present disclosure.

Please refer to FIGS. 1-2, the embodiments of the present disclosure provide a connecting structure 2, including a fastener 110, a first connecting component 21, and a second connecting component 22.

Figure 4:
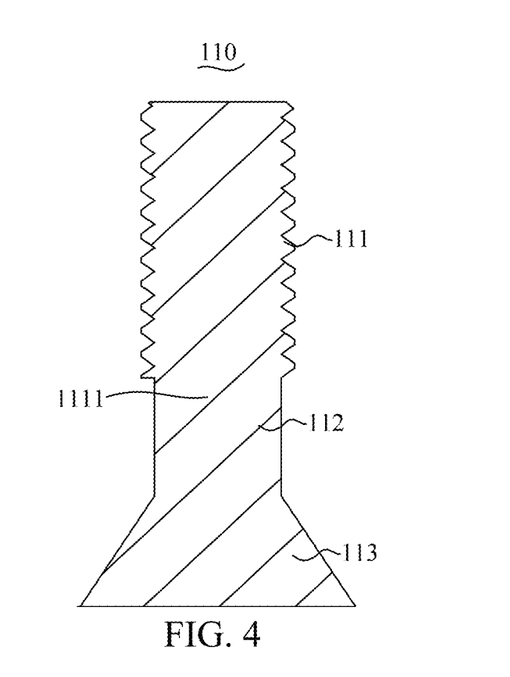
FIG. 4 is a structural schematic diagram of a fastener according to one embodiment of the present disclosure.

Please refer to FIG. 4, the fastener 110 includes a first limiting portion 111, a connecting portion 112, and a second limiting portion 113, the first limiting portion 111, the connecting portion 112, and the second limiting portion 113 are connected in sequence. Specifically, an outer diameter of the connecting portion 112 is less than both an outer diameter of the first limiting portion 111 and an outer diameter of the second limiting portion 113. In some embodiments, the fastener 110 is made of plastic, metal, alloy, and other materials, and is an integrally formed structure, and the first limiting portion 111, the connecting portion 112, and the second limiting portion 113 are integrally formed through processes, such as injection molding or casting. In some other embodiments, the fastener 110 is a separable structure, for example, the first limiting portion 111 and the connecting portion 112 are one part, and the second limiting portion 113 is another part; or, the first limiting portion 111 is one part, and the connecting portion 112 and the second limiting portion 113 are another part; or, the first limiting portion 111, the connecting portion 112, and the second limiting portion 113 are separate parts. Herein, materials and forms of the fastener 110 are not specifically limited in the present disclosure.

Figure 3:
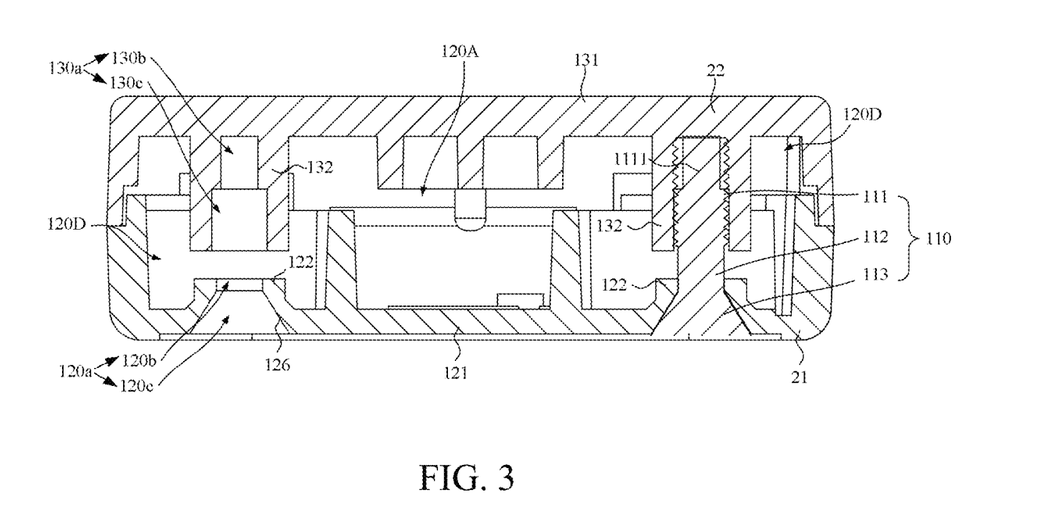
FIG. 3 is a cross-sectional schematic diagram of the battery box in a first viewing angle according to one embodiment of the present disclosure.

Please refer to FIG. 3, the first connecting component 21 defines a first fixing hole 120a. The second connecting component 22 defines a second fixing hole 130a, and the second fixing hole 130a is detachably engaged with the first limiting portion 111. Specifically, a hole diameter of at least one end of the first fixing hole 120a close to the second fixing hole 130a is less than both the outer diameter of the first limiting portion 111 and the outer diameter of the second limiting portion 113 and is greater than the outer diameter of the connecting portion 112. In some embodiments, the first connecting component 21 and the second connecting component 22 are made of plastic, such as, but not limited to, polypropylene (PP), polyethylene (PE), polystyrene (PS), polyvinyl chloride (PVC), polycarbonate (PC), etc., and the first fixing hole 120a and the second fixing hole 130a are integrally formed by injection molding.

During assembly, when the fastener 110 is the integrally formed structure, since the first connecting component 21 is made of plastic with a certain degree of deformability, the first limiting portion 111 of the fastener 110 is forcibly inserted through the first fixing hole 120a, and the second fixing hole 130a of the second connecting component 22 is fixed with respect to the first limiting portion 111, and at this time, the first connecting component 21 and the second connecting component 22 are fixed with respect to each other by the fastener 110 under a common limit of the first limiting portion 111 and the second limiting portion 113. Certainly, during the assembly, the first fixing hole 120a and the second fixing hole 130a are first aligned, and then the fastener 110 sequentially passes through the first fixing hole 120a and the second fixing hole 130a.

When the fastener 110 is the separable structure, the connecting portion 112 first passes through the first fixing hole 120a, then, the first limiting portion 111 and/or the second limiting portion 113 are fixed with respect to the connecting portion 112, and at this time, the fastener 110 and the first connecting component 21 are assembled and fixed, and then the second connecting component 22 and the fastener 110 are assembled and fixed. It may be understood that, when the fastener 110 is the separable structure, the first connecting component 21 is made of metal, alloy, hard plastic, etc.

During disassembly, the fastener 110 and the second fixing hole 130a are first separated, at this time, the first connecting component 21 and the second connecting component 22 are detached, and since the outer diameter of the first limiting portion 111 is less than a hole diameter of the first fixing hole 120a, the first limiting portion 111 is limited in the first fixing hole 120a, so that the fastener 110 is prevented from being separated from the first connecting component 21.

According to the connecting structure 2 of the present disclosure, in the assembled state, the fastener 110 passes through the first fixing hole 120a, and the first limiting portion 111 is fixed in the second fixing hole 130a, so that the first connecting component 21 is fixed with respect to the second connecting component 22. In a disassembled state, the first limiting portion 111 is separated from the second fixing hole 130a, so as to separate the first connecting component 21 and the second connecting component 22, moreover, the first limiting portion 111 is limited in the first fixing hole 120a, so as to prevent the fastener 110 from separating from the first connecting component 21. Such connection manner is simple, and the fastener 110 is prevented from being lost after disassembly, so that possibility that infants or pets accidentally swallow the fastener 110 is avoided. The first connecting component 21 and the second connecting component 22 112 are injection-molded parts, and the connecting structure 2 is applied to fields of toys, fans, battery boxes, etc. For example, some toys need to disassemble housings to replace a battery or clean internal components, the first connecting component 21 and the second connecting component 22 are respectively two housings of each of the toys, and each two housings are assembled and disassembled through a corresponding fastener 110. Similarly, when the fans need to disassemble housings to clean fan blades, a front housing and a rear housing of each of the fans are respectively formed as the first connecting component 21 and the second connecting component 22, and the front housing and the rear housing are assembled and disassembled through a corresponding fastener 110

In a second aspect, please refer to FIGS. 1-3, the present disclosure provides a battery box 10, including the connecting structure 2 as foregoing, a first housing 120 of the battery box 10 forms the first connecting component 21 and defines the first fixing hole 120a; a second housing 130 of the battery box 10 forms the second connecting component 22 and defines the second fixing hole 130a. The connecting structure 2 is described in detail by taking the battery box 10 as an example. The second housing 130 is detachably connected to the first housing 120, the first housing 120 and the second housing 130 are enclosed to define a mounting cavity 120A, and a first battery 140 is disposed in the mounting cavity 120A. In this example, after electric energy of the first battery 140 is exhausted, the first housing 120 and the second housing 130 are separated by the detaching the fastener 110, so as to replace the first battery 140 in the mounting cavity 120A, and the fastener 110 may not be lost, and after the first battery 140 is replaced, the fastener 110 is capable of being quickly re-fixed to the first housing 120 and the second housing 130 to complete assembly and fixation of the battery box 10.

Figure 5:
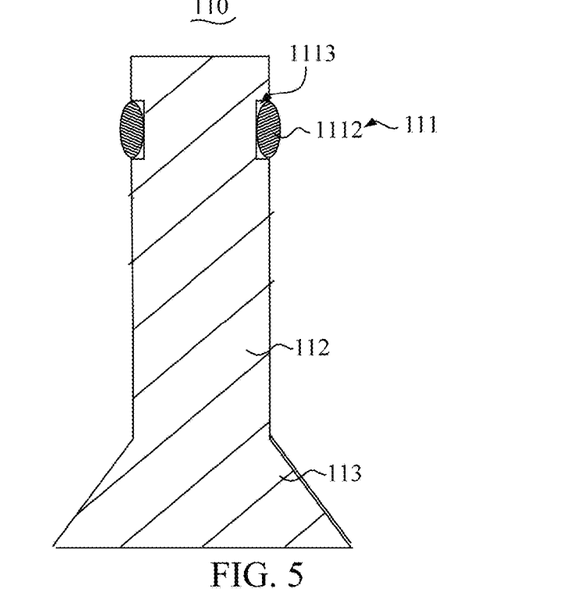
FIG. 5 is a structural schematic diagram of the fastener according to another embodiment of the present disclosure.

Please further refer to FIG. 5, in some embodiments, the second fixing hole 130a is a through hole, the first limiting portion 111 is in interference fit with the second fixing hole 130. Optionally, the first limiting portion 111 includes a rod body 1111 and a protruding component 1112 protruding from an outer wall of the rod body 1111, the protruding component 1112 is detachably connected to the rod body 1111. Specifically, the protruding component 1112 is selected from a rod shape, a block shape, a plate shape, a ring shape, etc., and a connection manner of the protruding component 1112 and the rod body 1111 includes, but is not limited to, snap-fit, threaded connection, and slip-fit. For example, a side wall of the rod body 1111 defines a clamping groove, the protruding component 1112 includes a clamping protrusion, and the clamping protrusion is snap-fitted into the clamping groove, so that the protruding component 1112 is fixed to the side wall of the rod body 1111, in this way, the protruding component 1112 is disposed at one end of the rod body 1111 to form the first limiting portion 111 and the connecting portion 112.

Optionally, the protruding component 1112 is a limiting ring. The limiting ring is sleeved on the rod body 1111, and the limiting ring is capable of increasing a contact area between the protruding component 1112 and the first housing 120. It may be understood that, since the outer diameter of the first limiting portion 111 is greater than the hole diameter of the first fixing hole 120a, a structure of the first housing 120 has a limiting effect, the limiting ring abuts against the first housing 120 and has a larger contact area with the first housing 120, so that the fastener 110 is less prone to loosening or falling off.

In order to improve stability of fixing the limiting ring, pleas further refer to FIG. 5, a groove 1113 is annularly defined on the outer wall of the rod body 1111, the limiting ring is partially embedded in the groove 1113 and is partially exposed out of the groove 1113. In some embodiments, the limiting ring is made of silicone, rubber, etc., and has a certain degree of deformability, so that when the limiting ring is in interference fit with the second fixing hole 130a, the limiting ring is better matched with a shape and a size of a hole wall of the second fixing hole 130a, thereby ensuring tightness and stability of connection. At the same time, these materials also have certain wear resistance and corrosion resistance, and is capable of prolonging a service life of the limiting ring.

In some embodiments, the second fixing hole 130a is a threaded hole, the first limiting portion 111 includes the rod body 1111 and external threads protruding from an outer wall of the rod body 1111, the first limiting portion 111 is in threaded fit with the second fixing hole 130a. In this example, the external threads are disposed on one end of a rod-shaped body, so that a portion of the rod-shaped body with the external threads is the first limiting portion 111, and a portion of the rod-shaped body without the external threads is the connecting portion 112, moreover, a protruding structure is disposed at one end, away from the external threads, of the rod-shaped body to form the second limiting portion 113, in this way, the fastener 110 of the embodiments of the present disclosure is an integrated structure or a screw structure that is partially threaded and partially unthreaded. In addition, the first limiting portion 111 and the second fixing hole 130a are in threaded fit and have good self-locking performance, and the stability of the connection is maintained even in a vibration or impact environment. Furthermore, in some embodiments, a common screwdriver slot type, such as a cross slot or a straight slot, is disposed on the second limiting portion 113, and a user may easily screw out the fastener 110 from the second fixing hole 130*a* by using a tool, such as a screwdriver, to implement a disassembly operation.

Please refer to FIG. 3, in some embodiments, the first fixing hole 120*a* includes a first hole segment 120*b* and a second hole segment 120*c*, the first hole segment 120*b* is connected to the second hole segment 120*c*, the first hole segment 120*b* is closer to the second fixing hole 130*a* than the second hole segment 120*c*. A hole diameter of the second hole segment 120*c* is less than the outer diameter of the first limiting portion 111, and the hole diameter of the second hole segment 120*c* gradually increases in a direction away from the first hole segment 120*b* to form a guide surface 126. In the embodiment where the fastener 110 is the integrated structure, the fastener 110 is enabled to more smoothly enter the second hole segment 120*c* due to the guiding surface 126, thereby reducing mounting difficulty and a force required for mounting the fastener 110.

Furthermore, a maximum hole diameter of the second hole segment 120*c* is greater than the outer diameter of the first limiting portion 111. During assembly, the first limiting portion 111 directly abuts against the guide surface 126, and then is forcibly inserted along the guide surface 126 until passing through the first fixing hole 120*a*.

Furthermore, the outer diameter of the first limiting portion 111 is not greater than 1.3 times a hole diameter of the first hole segment 120*b*. In this example, during the assembly, the fastener 110 encounters relatively low resistance, thereby reducing friction and compression caused by forceful insertion. In this way, wear and damage to the first housing 120 is minimized, structural integrity of the first housing 120 is maintained, and deformation or cracking of the first housing 120 due to stress concentration generated during the assembly is prevented. For example, when the hole diameter of the first hole segment 120*b* is 5 mm, the outer diameter of the first limiting portion 111 is between 5.4 mm and 6.5 mm; when the hole diameter of the first hole segment 120*b* is 6 mm, the outer diameter of the first limiting portion 111 is between 6.4 mm and 7.8 mm.

Please refer to FIG. 3, in some embodiments, the second fixing hole 130*a* includes a third hole segment 130*b* and a fourth hole segment 130*c*, the third hole segment 130*b* is connected to the fourth hole segment 130*c*, the third hole segment 130*b* is closer to the first hole segment 120*b* than the fourth hole segment 130*c*. A hole diameter of the third hole segment 130*b* is greater than the outer diameter of the first limiting portion 111, in the assembled state, the fourth hole segment 130*c* is fixed and engaged with the first limiting portion 111.

Please refer to FIG. 3, to facilitate formation of the first fixing hole 120*a* and the second fixing hole 130*a*, in the embodiments, the first housing 120 includes a first housing outer wall 121 and a first fixing column 122, the first fixing column 122 is connected to an inner wall surface of the first housing outer wall 121 and extends into the mounting cavity 120A, the first fixing column 122 and the first housing outer wall 121 together define the first fixing hole 120*a*. The second housing 130 includes a second housing outer wall 131 and a second fixing column 132, the second fixing column 132 is connected to an inner wall surface of the second housing outer wall 131 and extends into the mounting cavity 120A, the second fixing hole 130*a* is defined on the second fixing column 132. In this example, since fixing columns 132 that extend into the mounting cavity 120A are provided, a contact area between the fastener 110 and housings is increased, thereby improving the stability of the connection, preventing the fastener 110 from loosening or falling off in the vibration or impact environment, and also increasing structural strength of the housings. Furthermore, in some embodiments, the first hole segment of the first fixing hole 120*a* is defined on the first fixing columns, in this way, the first housing outer wall 121 is prevented from being damaged in a process that the fastener is forcibly inserted through the first fixing hole 120*a*.

It may be understood that the first fixing column 122 and the second fixing column 132 of the present disclosure are aligned in a thickness direction of the battery box 10, so that the first fixing hole 120*a* and the second fixing hole 130*a* are aligned, and an end surface of the first fixing column 122 abuts against an end surface of the second fixing column 132, or a gap between the end surface of the first fixing column 122 and the end surface of the second fixing column 132 is configured to be relatively small, in this way, in the assembled state, the first fixing column 122 and the second fixing column 132 most wraps the fastener 110, thereby reducing possibility of contact between the fastener 110 and an internal component of the battery box 10, so as to improve stability of the battery box 10.

Furthermore, based on above, the second fixing hole 130*a* includes a third hole segment 130*b* and a fourth hole segment 130*c*, the third hole segment 130*b* is connected to the fourth hole segment 130*c*, since the end surface of the first fixing column 122 abuts against the end surface of the second fixing column 132, or the gap between the end surface of the first fixing column 122 and the end surface of the second fixing column 132 is configured to be relatively small, in some embodiments, the third hole segment 130*b* is a limiting section, that is, retracting the fastener 110 from the fourth hole segment 130*c* allows for disassembly of the first housing 120 and the second housing 130.

An outer contour of the second limiting portion 113 is matched with an inner contour of the second hole segment 120*c*, in the assembled state, the second limiting portion 113 is accommodated in the second hole segment 120*c*. In this example, the second limiting portion 113 is accommodated in the second hole segment 120*c* to prevent the second limiting portion 113 from being directly impacted or damaged by an external environment, thereby preventing the fastener 110 from loosening or falling off in the vibration or impact environment, so as to further improve stability of an overall structure, moreover, dust, moisture, or other pollutants are prevented from entering an interior of the battery box 10 from the first fixing hole 120*a*.

Please refer to FIG. 1, the second housing 130 includes an assembling portion 134 and a folding portion 135. The assembling portion 134 is fixedly connected to the first housing 120, the folding portion 135 is rotatable around a position thereof connected to the assembling portion 134 and is detachably connected to the first housing 120, so as to open or close the mounting cavity 120A. The second fixing hole 130*a* is defined on the folding portion 135. In this way, after removing the fastener 110, the folding portion 135 is swung open, thereby allowing access to the mounting cavity 120A for easier replacement or mounting of the first battery 140.

Figure 6:
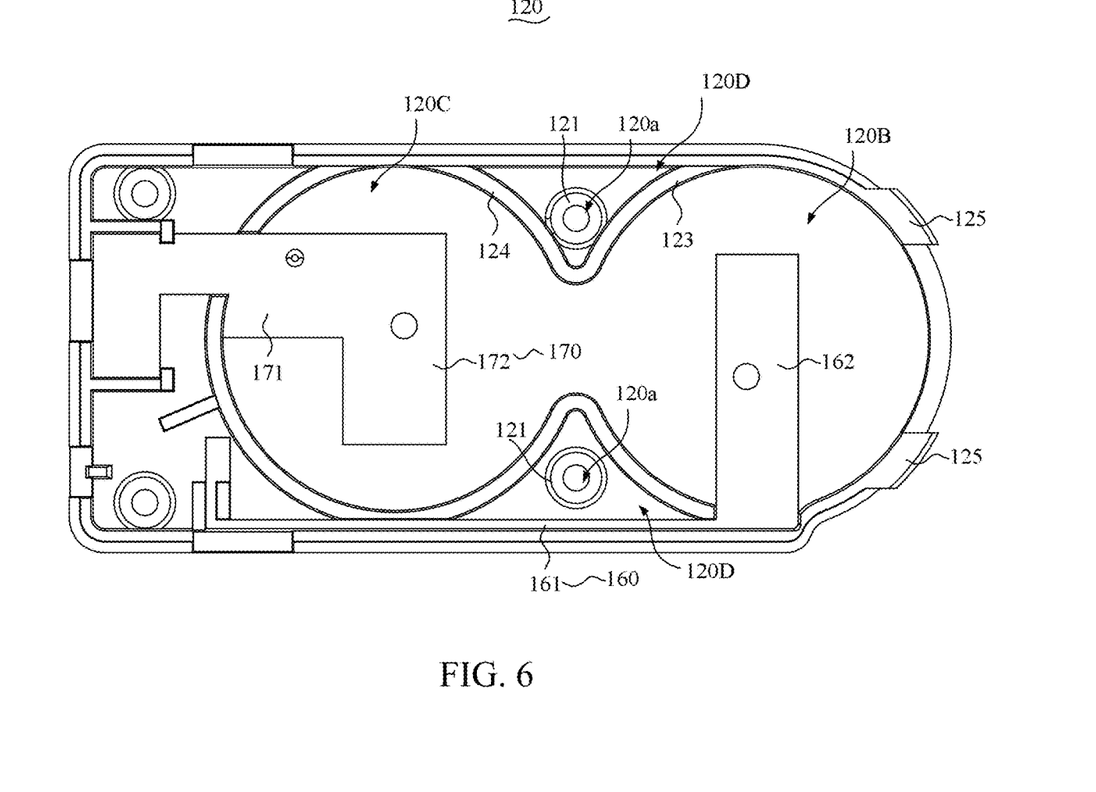
FIG. 6 is a structural schematic diagram of a first housing according to one embodiment of the present disclosure.

Please refer to FIG. 6, the first housing 120 includes a first protruding limiting portion 123 and a second protruding limiting portion 124. The first protruding limiting portion 123 is disposed in the mounting cavity 120A and defines a first accommodating groove 120B with a bottom wall of the mounting cavity 120A. The second protruding limiting portion 124 is disposed in the mounting cavity 120A and defines a second accommodating groove 120C with the bottom wall of the mounting cavity 120A. At least one of the first accommodating groove 120B and the second accommodating groove 120C is configured to mount the first battery 140, optionally, the first accommodating groove 120B and the second accommodating groove 120C are both configured to mount the first battery 140. The first protruding limiting portion 123 and the second protruding limiting portion 124 are both circular, the first fixing hole 120a is defined on a limiting space 120D between the first protruding limiting portion 123 and the second protruding limiting portion 124.

It may be understood that some of current batteries are circular structures, and the first accommodating groove 120B and the second accommodating groove 120C are configured to adapt to shapes of current circular batteries, so that the limiting space 120D is formed between the first accommodating groove 120B and the second accommodating groove 120C, and the first fixing hole 120a is defined on the limiting space 120D, which prevents the fastener 110 from occupying additional space, so as to enable a more compact overall structure of the battery box 10.

Please refer to FIG. 6, furthermore, two first fixing holes 120a are provided and are respectively defined at two opposite sides of each of the first protruding limiting portion 123 and the second protruding limiting portion 124, in this way, stability of fixing the first housing 120 and the second housing 130 by the fastener 110 is improved.

Figure 8:
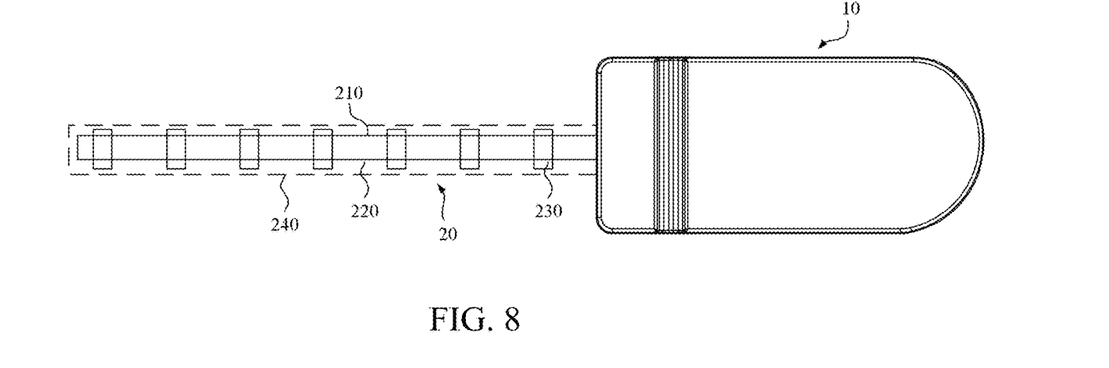
FIG. 8 is a structural schematic diagram of a lighting device according to one embodiment of the present disclosure.

In a third aspect, please refer to FIG. 8, the embodiments of the present disclosure further provide a lighting device 1, including a lighting assembly 20 and the battery box 10 as foregoing.

Please refer to FIG. 8, the lighting assembly 20 includes a first wire 210, a second wire 220, and a light source component 230. The light source component 230 includes lamp beads disposed at intervals, and an anode and a cathode of each of the lamp beads are respectively connected to the first wire 210 and the second wire 220. In some embodiments, the lamp beads are light emitting diode (LED) lamp beads, that is, the light source component 230 is a lamp strip. Certainly, in other embodiments, the light source device 230 is selected from a bulb, etc. In one example, the first wire 210 and the second wire 220 are aluminum wires, copper wires, iron wires, etc. In other embodiments, the lighting assembly 20 further includes a base layer, specifically, the base layer is a circuit board made of materials, such as PVC, polyester film (PET), and PE, the circuit board is rigid or flexible, and the first wire 210 and the second wire 220 are circuit layers coated on the base layer, and a specific form of the lighting assembly 20 is not limited in the present disclosure.

In order to improve a lighting effect of the lighting device 1, the lamp beads are capable of emitting lights of various colors, such as, but not limited to, red, green, yellow, etc. A plurality of colors may be emitted by one of the lamp beads, and lamp beads of different colors may also be disposed at intervals, which is not limited in the present disclosure.

Please refer to FIG. 8, furthermore, the lighting assembly 20 include a protective sleeve 240 covering the first wire 210, the second wire 220, and outer sides of the lamp beads, or the protective sleeve 240 covers outer sides of both of the first wire 210 and the second wire 220. In this way, service lives of the first wire 210 and the second wire 220 are prolonged, and the first wire 210 and the second wire 220 are prevented from being broken by an external force. In some embodiments, the protective sleeve 240 is transparent, and is made of plastic.

The lighting device 1 of the present disclosure includes the battery box 10 as foregoing, since the battery box 10 includes the first housing 120, the second housing 130, the first battery 140, and the fastener 110, in the disassembled state, the first limiting portion 111 of the fastener 110 is limited in the first fixing hole 120a, which prevents the fastener 110 from separating from the first connecting component 21, and after the first battery 140 is replaced, the fastener 110 is capable of being quickly re-fixed to the first housing 120 and the second housing 130. Since the lighting device 1 adopts technical solutions of the foregoing embodiments, all beneficial effects brought by the technical solutions of the foregoing embodiments are at least provided, and details are not described herein again.

Figure 7:
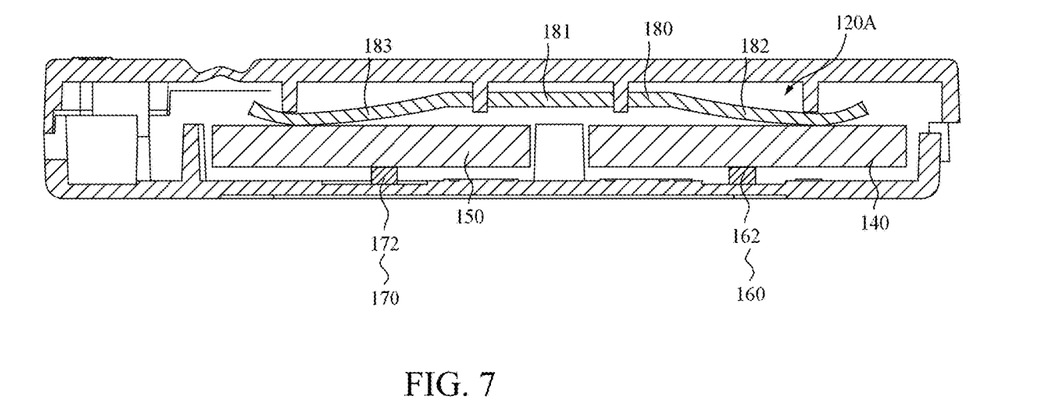
FIG. 7 is a cross-sectional schematic diagram of the battery box in a second viewing angle according to one embodiment of the present disclosure.

Please refer to FIG. 7, furthermore, the battery box 10 further includes a first conductive component 160, a second conductive component 170, a second battery 150, and a conductive body 180. The first battery 140 and the second battery 150 are respectively disposed in the first accommodating groove 120B and the second accommodating groove 120C, and are disposed side by side in a horizontal direction, the first conductive component 160 is configured to connect the first battery 140 and the first wire 210, the second conductive component 170 is configured to connect the second battery 150 and the second wire 220, the conductive body 180 is configured to connect the first battery 140 and the second battery 150, the first conductive component 160 and the second conductive component 170 are disposed on the first housing 120, and the conductive body 180 is disposed on the second housing 130.

Please refer to FIG. 7, in order to improve stability of connection between the conductive body 180 and the first battery 140 and the second battery 150, the conductive body 180 includes a mounting portion 181, a first elastic contact portion 182, and a second elastic contact portion 183, the first elastic contact portion 182 and the second elastic contact portion 183 are respectively connected to two ends of the mounting portion 181, the mounting portion 181 is fixedly connected to the second housing 130, the mounting portion 181 is fixed with respect to the second housing 130 through bonding, threaded connection, snap-fit, etc. The first elastic contact portion 182 is electrically connected to the first battery 140, and the second elastic contact portion 183 is electrically connected to the second battery 150. Specifically, the first elastic contact portion 182 is curved toward the first battery 140, and the second elastic contact portion 183 is curved toward the second battery 150. In this way, the first elastic contact portion 182 and the second elastic contact portion 183 have a certain degree of deformability, thereby enhancing the stability of the connection between the conductive body 180 and the first battery 140 and the second battery 150. As a result, stability of electrical connection is also improved. In some embodiments, the conductive body 180 is a conductive sheet and is made of aluminum, copper, iron, or other suitable conductive materials.

Please refer to FIGS. 6-7, in some embodiments, the second conductive component 170 and the first conductive component 160 are conductive sheets, the first conductive component 160 includes a first fixing portion 161 and a third elastic contact portion 162, the first fixing portion 161 is connected to the third elastic contact portion 162, the first fixing portion 161 and the first housing 120 are fixed with respect to each other, and the third elastic contact portion 162 is curved toward a direction close to the first battery 140. The second conductive component 170 includes a second fixing portion 171 and a fourth elastic contact portion 172, the second fixing portion 171 is connected to the fourth elastic contact portion 172, the second fixing portion 171 and the first housing 120 are fixed with respect to each other, and the fourth elastic contact portion 172 is curved toward a direction close to the second battery 150. In this way, mounting the first conductive component 160 and the second conductive component 170 on the housings is simple, and stability of connection between the second battery 150 and the first battery 140 is good.

Optionally, the first housing 120 includes at least one first snap-fit structure 125, the second housing 130 includes at least one second snap-fit structure 136, the at least one first snap-fit structure 125 is snap-fitted to the at least one second snap-fit structure 136. Certainly, in some embodiments, the first snap-fit structure 125 is a snap-fit, the second snap-fit structure 136 is a snap-fit groove, and stability of fixing the first housing 120 and the second housing 130 is further improved by the first snap-fit structure 125 and the second snap-fit structure 136.

Same or similar reference numerals in the drawings of the embodiments of the present disclosure correspond to the same or similar components. In the description of the present disclosure, it should be understood that orientations or working position relationships indicated by terms "upper", "lower", "left", "right", etc. are only for ease of description of the present disclosure and simplified description, rather than indicating or implying that the referred device or element must have a specific orientation, and is constructed and operated in a specific orientation, so the terms describing the working position relationships in the accompanying drawings are only used for exemplary description and cannot be understood as a limitation to the present disclosure, and for those who skilled in the art, specific meanings of above terms may be understood according to specific situations.

The above are only preferred embodiments of the present disclosure and are not intended to limit the present disclosure, and any modification, equivalent replacement and improvement made within a spirit and a principle of the present disclosure shall fall within a protection scope of the present disclosure.

What is claimed is:

1. A battery box, comprising:
    at least one fastener;
    a first housing;
    a second housing; and
    a first battery;
    wherein the at least one fastener comprises a first limiting portion, a connecting portion, and a second limiting portion, the first limiting portion, the connecting portion, and the second limiting portion are connected in sequence, an outer diameter of the connecting portion is less than both an outer diameter of the first limiting portion and an outer diameter of the second limiting portion;
    wherein the first housing defines at least one first fixing hole, a hole diameter of the at least one first fixing hole is less than the outer diameter of the first limiting portion and is greater than the outer diameter of the connecting portion;
    wherein the second housing is detachably connected to the first housing, the first housing and the second housing are enclosed to form a mounting cavity, the second housing defines at least one second fixing hole, the at least one second fixing hole is detachably engaged with the first limiting portion;
    wherein the first battery is disposed in the mounting cavity;
    wherein in an assembled state, the at least one fastener passes through the at least one first fixing hole and is fixed in the at least one second fixing hole to fix the first housing and the second housing with respect to each other, and in a disassembled state, the at least one fastener is detached from the at least one second fixing hole, the first housing and the second housing are detachable, and the first limiting portion is limited at the at least one first fixing hole, so as to prevent the at least one fastener from separating from the at least one first fixing hole;
    wherein the second housing comprises an assembling portion and a folding portion, the assembling portion is fixedly connected to the first housing, the folding portion is rotatable around a position thereof connected to the assembling portion and is detachably connected to the first housing, so as to open or close the mounting cavity, and the at least one second fixing hole is defined on the folding portion.

2. The battery box according to claim 1, wherein the first housing comprises a first housing outer wall and at least one first fixing column, the at least one first fixing column is connected to an inner wall surface of the first housing outer wall and extends into the mounting cavity, the at least one first fixing column and the first housing outer wall together define the at least one first fixing hole; and
    the second housing comprises a second housing outer wall and at least one second fixing column, the at least one second fixing column is connected to an inner wall surface of the second housing outer wall and extends into the mounting cavity, the at least one second fixing hole is defined on the at least one second fixing column.

3. The battery box according to claim 1, wherein the first housing comprises a first protruding limiting portion and a second protruding limiting portion;
    the first protruding limiting portion is disposed in the mounting cavity and defines a first accommodating groove with a bottom wall of the mounting cavity;
    the second protruding limiting portion is disposed in the mounting cavity and defines a second accommodating groove with the bottom wall of the mounting cavity; and
    at least one of the first accommodating groove and the second accommodating groove is configured to mount the first battery, the first protruding limiting portion and the second protruding limiting portion are both circular, the at least one first fixing hole is defined on a limiting space between the first protruding limiting portion and the second protruding limiting portion.

4. The battery box according to claim 3, wherein two first fixing holes are provided and are respectively defined at two opposite sides of each of the first protruding limiting portion and the second protruding limiting portion.

5. A lighting device, comprising:
    a lighting assembly; and
    the battery box according to claim 1; a battery box;
    wherein the battery box comprises at least one fastener, a first housing, a second housing, and a first battery, a second battery, a first conductive component, a second conductive component, and a conductive body;
    wherein the at least one fastener comprises a first limiting portion, a connecting portion, and a second limiting portion, the first limiting portion, the connecting portion, and the second limiting portion are connected in sequence, an outer diameter of the connecting portion is less than both an outer diameter of the first limiting portion and an outer diameter of the second limiting portion;

wherein the first housing defines at least one first fixing hole, a hole diameter of the at least one first fixing hole is less than the outer diameter of the first limiting portion and is greater than the outer diameter of the connecting portion;

wherein the second housing is detachably connected to the first housing, the first housing and the second housing are enclosed to form a mounting cavity, the second housing defines at least one second fixing hole, the at least one second fixing hole is detachably engaged with the first limiting portion;

wherein the first battery is disposed in the mounting cavity;

wherein in an assembled state, the at least one fastener passes through the at least one first fixing hole and is fixed in the at least one second fixing hole to fix the first housing and the second housing with respect to each other, and in a disassembled state, the at least one fastener is detached from the at least one second fixing hole, the first housing and the second housing are detachable, and the first limiting portion is limited at the at least one first fixing hole, so as to prevent the at least one fastener from separating from the at least one first fixing hole;

wherein the lighting assembly comprises a first wire, a second wire, and a light source component, the light source component is electrically connected to the first wire and the second wire;

wherein the battery box is electrically connected to the first wire and the second wire and is configured to supply power to the light source component;

wherein the conductive body comprises a mounting portion, a first elastic contact portion, and a second elastic contact portion, the first elastic contact portion and the second elastic contact portion are respectively connected to two ends of the mounting portion;

wherein the first elastic contact portion is configured to connect to the first battery, and the second elastic contact portion is configured to connect to the second battery.

6. The lighting device according to claim 5, wherein
the first battery, the second battery, the first conductive component, the second conductive component, and the conductive body are all disposed in the mounting cavity, the at least one fastener cooperates with the first housing and the second housing to switch the first housing and the second housing between the assembled state and a disassembled state; and the first battery is electrically connected to the first wire through the first conductive component, the second battery is electrically connected to the second wire through the second conductive component, and the first battery is electrically connected to the second battery through the conductive body.

7. The lighting device according to claim 5, wherein the first housing comprises at least one first snap-fit structure, the second housing comprises at least one second snap-fit structure, the at least one first snap-fit structure is snap-fitted to the at least one second snap-fit structure.

8. The lighting device according to claim 5, wherein the light source component comprises lamp beads disposed at intervals, and the lamp beads are respectively connected to the first wire and the second wire.

\* \* \* \* \*